Patented July 2, 1940

2,206,642

UNITED STATES PATENT OFFICE 2,206,642

COMPOSITION OF MATTER AND PROCESS OF PRODUCING IT

Joseph C. Patrick, Trenton, N. J., assignor to Thiokol Corporation, Yardville, N. J., a corporation of Delaware No Drawing. Application July 28, 1934, Serial No. 737,389. Renewed November 30, 1939

6 Claims. (Cl. 260—33)

This invention relates to a composition of matter containing sulfur and the process of producing the same. It relates more particularly to a composition, one of the principal constituents of which is the reaction products resulting from the reaction of soluble polysulfides upon certain organic compounds.

In my Patent No. 1,890,191 of December 6, 1932, reaction products and the method of making the same are described, that are produced by causing reaction to take place between alkaline or soluble polysulfides and olefin compounds containing the group $C_nH_{2n}$ combined with the equivalent of two monovalent negative radicals. Such reaction products comprise or are made up of sulfur and olefin of the general formula $C_nH_{2n}$ chemically combined, or they are the reaction products of soluble or alkaline polysulfides and additive compounds of olefins having the general formula $C_nH_{2n}X_2$, where "X" is a negative radical. Such reaction products may be used in the present invention.

Instead of using as one of the main constituents of the composition that is the subject matter of the present invention the reaction products described in the preceding paragraph, one of the principal constituents of the composition may be the reaction products that are obtained by causing soluble or alkaline polysulfides to react upon a compound of the general formula $XCH_2$—R—$CH_2X'$, in which "X" and "X'" are monovalent negative elements or groups, "R" is a divalent element or group and in which two negative elements "X" and "X'" may be the same or different and either or both may be, for example, a halogen or either or both may be negative group radicals, such as, for example, $CH_3.COO$; while "R" must be a divalent element or radical capable of existing in stable combination with two symmetrically arranged methylene groups. A few of the typical compounds of the very large number of compounds included in this general formula are: symmetrical dichloroethyl ether, symmetrical dibromomethyl ether, symmetrical chloroethoxy chloroethyl ether, symmetrical dibromo-diethyl sulfide, para xylylene dichloride and symmetrical dichloromethylethyl ether. During the reaction involving the alkaline polysulfide the substituents X and X' are split off.

The reaction products described above which constitute one of the main constituents of the new composition of matter have remarkable properties, such as high degree of chemical stability, resistance to a large variety of organic solvents making them substantially insoluble in such solvents, high resistance to atmospheric oxidation, and resistance to attack by dilute solutions of acids and alkalies. They are of a plastic character and possess a considerable degree of flexibility and elasticity; they can be compounded with pigments, such as zinc oxide, carbon black, litharge, etc., or with other plastics, such as rubber, for example; they can be made to adhere tenaciously to rubber or porous surfaces or surfaces of other substances, such as cements, fabrics, wood, etc., with or without the use of intermediate adhesives; they have high dielectric strength and excellent insulating properties for both heat and electricity and they are non-hygroscopic.

The compositions of matter made in accordance with this invention may be termed plastic compositions which possess the characteristics enumerated above, but which are generally softer than the reaction products or plastics described above, so that they are in better condition to enable them to be mixed and calendered and put through tubing operation or operations whereby tubes of the new composition of matter are formed. Also the compositions of the present invention often possess increased tensile strength, decreased permanent set and increased modulus of elasticity as compared to the reaction products constituting one of the main constituents of the compositions.

In carrying out the invention the tetramethyl-thiuram-disulfide (commonly known as "Tuads") or tetramethyl-thiuram-tetrasulfide is added to the reaction products or plastic material described above and thoroughly incorporated therein in any convenient way as by kneading or by having these softening compounds present when the reactions which form these plastic compounds take place, or by making a latex and precipitating the latex of these plastic reaction products and introducing the softening compounds. The introduction of only a small amount of these softening compounds, say 0.1 of a per cent. or less, into the reaction products or plastic brings about an appreciable softening action that aids considerably in mixing, calendering and tubing operations, although considerably larger amounts may be used when desired to increase the softening effect.

This invention can be carried out not only by adding the tetramethyl-thiuram-disulfide (or tetrasulfide) to the plastic reaction products described above and to mixtures of them, but also to such reaction products together with a large variety of compounding agents, such as rubber, zinc oxide, carbon black, rubber accelerators, etc., taken singly or in various proportions and combinations.

The following specific example is given for the purpose of aiding in understanding this invention, but it is to be understood that the invention is not restricted to the ingredients or proportions specified. In this example the constituents in the composition are:

100 parts by weight of the plastic reaction products resulting from the reaction of an alkaline polysulfide upon ethylene dihalide, 5 parts of rubber, 10 parts of zinc oxide, 25 parts of carbon black, 0.35 part of diphenyl guanidine, 0.50 part of stearic acid and 0.50 part of tetramethyl-thiuram-disulfide.

The tetramethyl-thiuram-disulfide or tetramethyl-thiuram-tetrasulfide may be added in any convenient way to the plastic reaction products resulting from causing alkaline polysulfides to react upon olefinic compounds containing the group $C_nH_{2n}$ combined with the equivalent of two monovalent negative radicals or resulting from causing alkaline polysulfide to react upon a compound of the formula $XCH_2$—R—$CH_2X'$ as defined above. For example, the mixing of the softener with the plastic reaction products may be made by first milling the softening compound and a rubber accelerator into rubber and then adding this mixture to the plastic reaction products after they have been run on the rolls of a mill until they band the rolls. The batch then quickly softens on the mill to the point where pigments and other compounding materials can be added.

By adding the softener the mixing time is reduced as the carbon black works in more quickly, or more carbon black can be used, a lower temperature is permissible, and less odor is noticeable. The softness persists for weeks and is not destroyed even when the composition is rewarmed on the mill rolls; the composition does not become porous when it is cured by heating it; its solubility in organic solvents is not increased and the flexibility at low temperatures seems to be improved. The softening effect is quite noticeable in compositions made in accordance with this invention even when there is only a small amount of rubber and a large amount of carbon black present.

I claim:

1. A composition of matter capable of being cured by heat comprising a tetramethyl thiuram sulfide incorporated with the reaction product of an alkaline polysulfide and an organic compound having a substituent attached to each of two terminal carbon atoms which substituent is split off during the reaction.

2. A composition of matter capable of being cured by heat comprising a tetramethyl thiuram sulfide incorporated with the reaction product of an alkaline polysulfide and an organic compound having a halogen attached to each of two terminal aliphatic carbon atoms.

3. A composition of matter capable of being cured by heat comprising a tetramethyl thiuram sulfide incorporated with the reaction product of an alkaline polysulfide and an ether having a substituent attached to each of two terminal carbon atoms which substituent is split off during the reaction.

4. A composition of matter capable of being cured by heat comprising a tetramethyl thiuram sulfide incorporated with the reaction product of an alkaline polysulfide and an ether having a halogen attached to each of two terminal aliphatic carbon atoms.

5. A composition of matter capable of being cured by heat comprising a tetramethyl thiuram sulfide incorporated with the reaction product of an alkaline polysulfide and an organic compound having a substituent attached to each of two terminal carbon atoms which substituent is split off during the reaction, the proportion of the thiuram sulfide in the composition being of the order of 0.5 to 0.1 per cent.

6. A composition of matter capable of being cured by heat comprising a tetramethyl thiuram sulfide incorporated with the reaction product of an alkaline polysulfide and an organic compound having a halogen attached to each of two terminal aliphatic carbon atoms, the proportion of the thiuram sulfide in the composition being of the order of 0.5 to 0.1 per cent.

JOSEPH C. PATRICK.